(12) United States Patent
Bordry

(10) Patent No.: US 8,140,298 B2
(45) Date of Patent: Mar. 20, 2012

(54) SYSTEM AND METHOD FOR DIAGNOSING AIRCRAFT COMPONENTS FOR MAINTENANCE PURPOSES

(75) Inventor: Christophe Bordry, Cugnaux (FR)

(73) Assignee: Airbus Operations SAS, Toulouse (FR)

( * ) Notice: Subject to any disclaimer, the term of this patent is extended or adjusted under 35 U.S.C. 154(b) by 977 days.

(21) Appl. No.: 12/098,175

(22) Filed: Apr. 4, 2008

(65) Prior Publication Data
US 2009/0076776 A1 Mar. 19, 2009

(30) Foreign Application Priority Data
Apr. 6, 2007 (FR) ...................................... 07 54393

(51) Int. Cl.
*G06F 11/30* (2006.01)
*G06F 19/00* (2006.01)
(52) U.S. Cl. ...................................................... 702/185
(58) Field of Classification Search .................. 702/185
See application file for complete search history.

(56) References Cited

U.S. PATENT DOCUMENTS

| | | | |
|---|---|---|---|
| 6,208,955 B1 * | 3/2001 | Provan et al. | ................... 703/20 |
| 2004/0078171 A1 | 4/2004 | Wegerich et al. | |
| 2004/0162651 A1 * | 8/2004 | Halm et al. | ..................... 701/29 |
| 2006/0212281 A1 | 9/2006 | Mathews, Jr. et al. | |
| 2007/0088982 A1 * | 4/2007 | Guralnik et al. | ................. 714/26 |
| 2007/0260425 A1 * | 11/2007 | Kim | ............................. 702/182 |

* cited by examiner

*Primary Examiner* — Cindy H Khuu
(74) *Attorney, Agent, or Firm* — Oblon, Spivak, McClelland, Maier & Neustadt, L.L.P.

(57) ABSTRACT

The invention relates to a process for determining a diagnostic for a breakdown of an avionic system, the avionic system comprising a plurality of functional units and surveillance units, each capable of performing surveillance of at least one functional unit, characterized in that it comprises the following steps: acquisition of diagnostics from at least one surveillance unit, a diagnostic emitted by one surveillance unit relating to the said at least one functional unit subjected to surveillance by the surveillance unit, construction of possible diagnostics on the basis of the acquired diagnostics, determination of a likelihood criterion for each constructed possible diagnostic, the likelihood criterion for a possible diagnostic being determined on the basis of a unitary criterion determined for each functional unit associated with the possible diagnostic, selection of the possible diagnostic among the possible diagnostics according to the likelihood criterion.

11 Claims, 4 Drawing Sheets

SYSTEM AND METHOD FOR DIAGNOSING AIRCRAFT COMPONENTS FOR MAINTENANCE PURPOSES

BACKGROUND

The present invention relates to the determination of a diagnostic for a breakdown in an avionic system, and more particularly to a process and device for determining a diagnostic for a breakdown of a functional unit in an on-board avionic system.

The purpose of the diagnostic is to guide a maintenance operator in repairing the avionic system, or in other words in restoring the airplane to normal operation.

The diagnostic may be worked up by a maintenance system on board the airplane or by a maintenance system on the ground.

Avionic systems are composed of a set of functional units such as, for example, calculators, cabling, sensors, applications. These functional units are known as replaceable entities in an airplane, and are also called LRU ("Line Replaceable Unit" in English terminology). The functional units that participate in one and the same function in the avionic system are grouped within systems, and each functional unit belongs to only one single system.

There are known on-board maintenance architectures in which each system is provided with a surveillance unit, also known as BITE ("Built In Test Equipment" in English terminology), which is responsible for surveillance of one or more functional units as well as the functional units connected to this system.

According to these architectures, the different surveillance units rely on surveillance devices, also known as "monitoring" devices in English terminology, which, on the basis of detected symptoms, work up a local diagnostic explaining these symptoms.

This local diagnostic is made up of a certain number of unitary diagnostics, which are associated with a suspect functional unit if the detected symptoms can be explained by the failure of a functional unit, or with several suspect functional units if the symptoms can be explained by the simultaneous failure of several functional units.

An example is illustrated in FIG. 1.

According to this example, a functional unit A (LRU A) receives datum x from functional unit B (LRU B), and this datum x is produced by functional units C (LRU C) and D (LRU D).

Thus, according to this example, if functional unit A no longer receives the data x, then the surveillance unit of the system to which functional unit A belongs will emit the following local diagnostic:

LRU A or LRU B or (LRU C and LRU D)

Thus this local diagnostic is composed of three unitary diagnostics, or in other words LRU A, LRU B and (LRU C and LRU D).

The number of unitary diagnostics is directly related to the ability of the surveillance unit to isolate or not isolate the breakdown.

In the example under consideration, the surveillance unit was not able to determine whether the symptom "functional unit A no longer receives datum x from functional unit B" is due to a failure of functional unit A, which is the data acquisition unit or of functional unit B, or to a double failure of functional units C and D.

Thus, according to these on-board maintenance architectures, when a functional unit suffers a breakdown, several surveillance units detect this failure, and each sends a local diagnostic to a central maintenance system, also known as CMS ("Centralized Maintenance System" in English terminology).

According to a known central maintenance system, this attempts to correlate the different local diagnostics with one another in such a way as to choose one of the local diagnostics, also known as "originating message", which best reflects the breakdown that originated the different correlated local diagnostics.

Thus, according to these on-board maintenance architectures, the precision of the diagnostic is related firstly to the choice of the local diagnostic and secondly to the number of unitary local diagnostics emitted from the originating message.

Nevertheless, these architectures therefore have the disadvantage of emitting a diagnostic that does not have the greatest relevance.

BRIEF SUMMARY

The object of the present invention is to remedy at least one of the disadvantages of the techniques and processes of the cited prior art. To achieve this, the invention proposes in particular a process and a device for determining a diagnostic for a breakdown of an avionic system capable of determining a diagnostic having a higher level of relevance and in this way making it possible to shorten the repair time by indicating directly to the maintenance operator the defective functional unit, without his having to take preliminary actions aimed at isolating the breakdown.

The object of the invention is therefore a process for determining a diagnostic for a breakdown of an avionic system, the avionic system comprising a plurality of functional units and surveillance units, each capable of performing surveillance of at least one functional unit, characterized in that it comprises the following steps:

acquisition of diagnostics from a plurality of surveillance units, a diagnostic emitted by one surveillance unit relating to several functional units subjected to surveillance by the surveillance unit, construction of possible diagnostics relating to the said functional units, on the basis of the acquired diagnostics, determination of a likelihood criterion for each constructed possible diagnostic, the likelihood criterion for a possible diagnostic being determined according to the functional units associated with the possible diagnostic, for example on the basis of a unitary criterion determined for each of these units, selection of the possible diagnostic among the possible diagnostics according to the likelihood criterion.

The invention furnishes a diagnostic process for a breakdown of functional entities of an airplane, especially replaceable entities of the airplane, such that the said process no longer selects a set of unitary local diagnostics but instead selects the most likely diagnostic according to the possible diagnostics and their likelihood criterion.

To achieve this, there are constructed, on the basis of diagnostics acquired by surveillance units, possible diagnostics for which a likelihood criterion is determined in such a way as to improve the diagnostic for a breakdown. The possible diagnostics are determined, for example, by combinations of diagnostics.

The possible diagnostic is then selected according to the likelihood criterion, and it may be, for example, the possible diagnostic having the highest likelihood criterion.

In this way the repair time is also shortened by indicating the defective functional entity directly to the maintenance technician without his having to take preliminary actions aimed at isolating the breakdown.

According to a particular characteristic, the likelihood criterion for a possible diagnostic is determined on the basis of the information of each functional unit associated with the possible diagnostic. In particular, the said information of a functional unit making it possible to determine a criterion for the functional unit, for example, comprises:

the detectability of the mode of breakdown of the functional unit by at least one surveillance unit capable of performing surveillance of the functional unit, and knowledge of the different surveillance units of the avionic system, and the diagnostics emitted or not emitted by the said at least one surveillance unit capable of detecting a breakdown of the functional unit.

According to this characteristic, the likelihood criterion is a function of a unitary criterion or of information determined on the basis of knowledge about the different surveillance units, and in particular knowledge about their abilities to report any dysfunctions of the functional units.

According to another particular characteristic, the said information of a functional unit comprises:

the detectability of each mode of breakdown of the functional unit by each surveillance unit capable of performing surveillance of the functional unit, and the knowledge of the different surveillance units of the avionic system, and the diagnostics emitted or not emitted by the said at least one surveillance unit capable of detecting a breakdown of the functional unit.

According to one embodiment, the step of construction of possible diagnostics comprises a step of organizing the diagnostics whose diagnostics cast suspicion on at least one functional unit into groups of two.

According to a particular characteristic, the process comprises a step of determination, on the basis of the set of possible diagnostics, from at least one observation by the said at least one surveillance unit for each functional unit, an observation corresponding to the detection of a breakdown of a functional unit by a surveillance unit.

According to another particular characteristic, the said at least one observation represents the diagnostics emitted or not emitted by the said at least one surveillance unit capable of detecting a breakdown of the functional unit.

According to yet another particular characteristic, the said information of each functional unit, or unitary criterion as the case may be, is determined according to a weighting coefficient of each surveillance unit capable of performing surveillance of the functional unit.

According to this characteristic, it is made possible, by means of the weighting coefficient, to give preference to certain diagnostics.

The present invention is also aimed at a storage means, which may be partly or completely removable, which can be read by a computer or a microprocessor containing instructions of a computer program that permit implementation of the process such as explained hereinabove.

Correspondingly, the invention is also aimed at a device for determining a diagnostic for a breakdown of an avionic system, the avionic system comprising a plurality of functional units and of surveillance units, each capable of performing surveillance of at least one functional unit, characterized in that it comprises the following means:

means for acquisition of diagnostics of a plurality of surveillance units, a diagnostic emitted by a surveillance unit relating to several functional units subjected to surveillance by the surveillance unit, means for construction of possible diagnostics relating to the said functional units on the basis of the acquired diagnostics, means for determination of a likelihood criterion, which means are capable of determining a likelihood criterion for each constructed possible diagnostic, the likelihood criterion for a possible diagnostic being determined according to the functional units associated with the possible diagnostic, means for selection of the possible diagnostic among the possible diagnostics according to the likelihood criterion.

This device has the same advantages as the modification process described briefly hereinabove.

Other advantages, objectives and characteristics of the present invention become apparent from the detailed description hereinafter, written by way of non-limitative example, with regard to the attached drawings, wherein:

DETAILED DESCRIPTION

According to the invention, a maintenance system attempts, on the basis of the set of symptoms indicative of one or more dysfunctions that have been recorded by surveillance units, to isolate the breakdown in order to indicate to the operator those functional units that are not functioning correctly and therefore those equipment items of the airplane that are to be replaced, especially the replaceable entities in the aircraft, such as, for example, the calculators, the sensors, the software programs.

To achieve this, the system relies on local agents, the surveillance units (BITE) and on a centralized part known as CMS ("Centralized Maintenance System" in English terminology), which work up a diagnostic at the airplane level, this diagnostic being known as PFR ("Post Flight Report" in English terminology).

According to the invention, the diagnostic worked up by the centralized part consists in determining the most likely diagnostic on the basis of the set of received symptoms, especially according to the architecture of the aircraft and the performances of the different surveillance systems of the aircraft.

Figure 1:
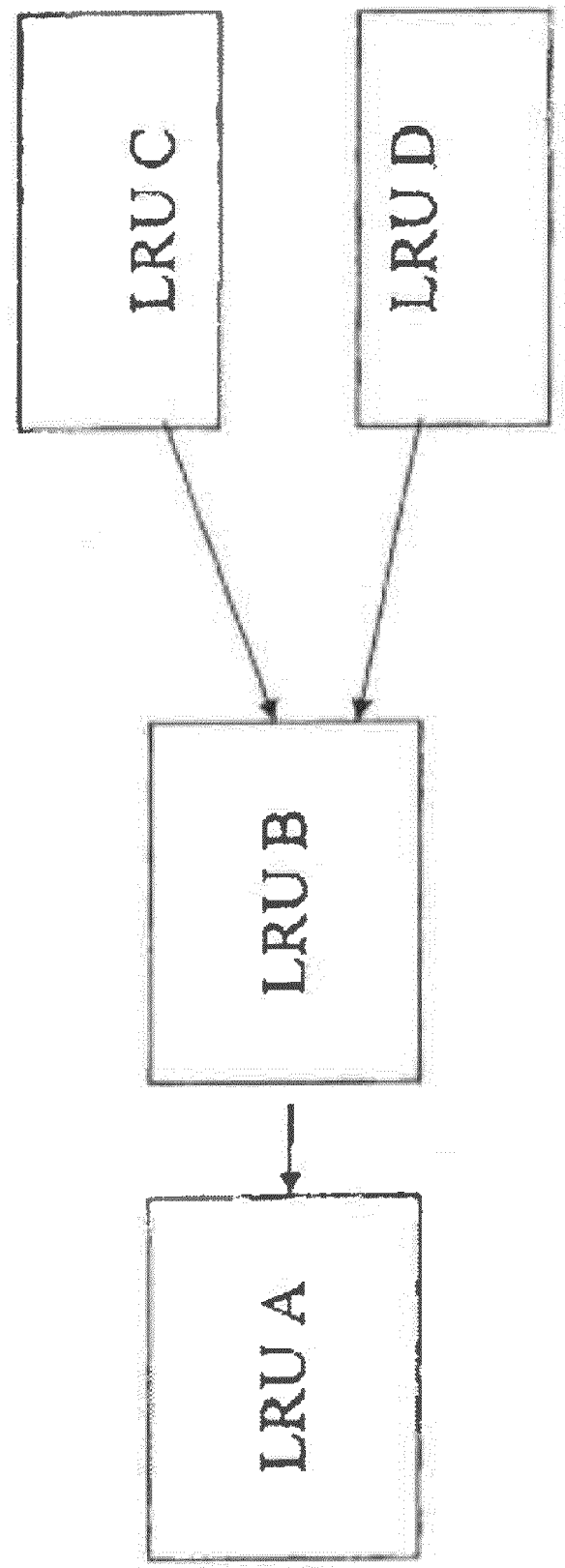
FIG. 1 gives an example of determination of a diagnostic according to the prior art.
Figure 2:
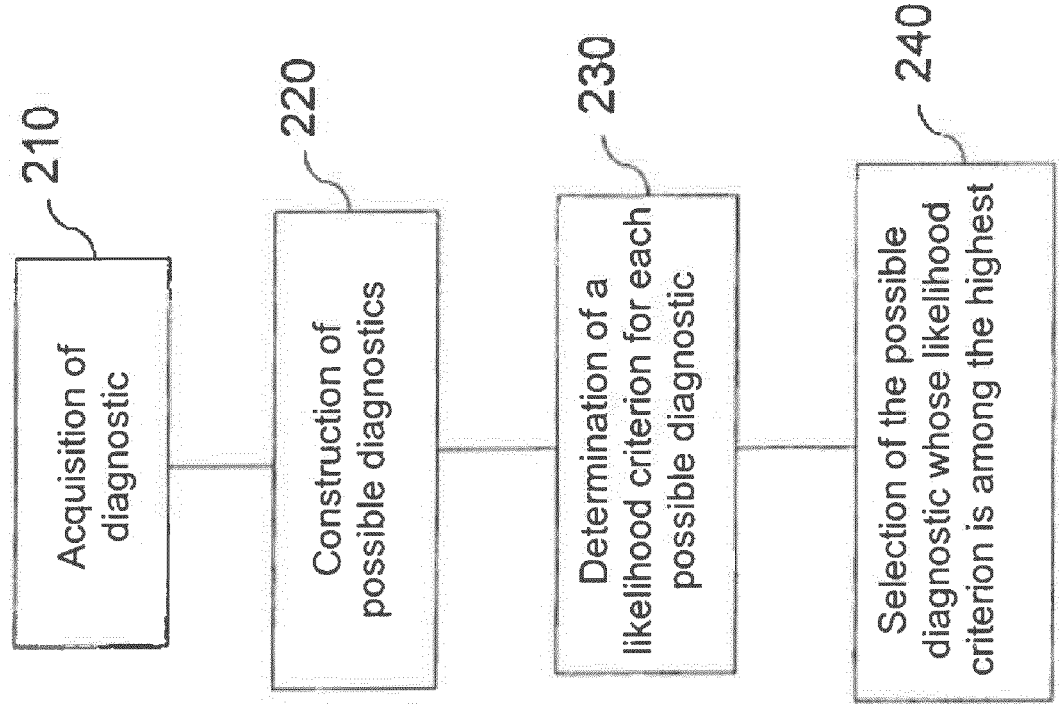
FIG. 2 represents an algorithm for determination of a diagnostic according to the invention.

The algorithm illustrated in FIG. 2 for determination of the most likely diagnostic now is described.

The algorithm begins in step 210 with the acquisition of unitary local diagnostics associated with at least one functional unit, these unitary local diagnostics being identified on the basis of detected symptoms.

The diagnostics are emitted by one or more surveillance units capable of performing surveillance of the functional unit or units.

According to the invention, different types of symptoms are considered, such as the operational dysfunctions, the alarms.

Similarly, the source of the local diagnostics is not limitative, in fact, there can be considered, for example, a surveillance unit, a flight alarm ("Flight Warning" in English terminology) or an acquisition part of the central maintenance system.

Step 210 is followed by step 220, which consists in constructing possible diagnostics from acquired diagnostics.

Then step 220 is followed by step 230, in the course of which there is determined a likelihood criterion for each possible diagnostic constructed during step 220.

To achieve this, the likelihood criterion for a possible diagnostic is determined on the basis of a unitary criterion determined for each functional unit of the possible diagnostic.

The unitary criterion for a functional unit is determined on the one hand on the basis of the detectability of each mode of breakdown of the functional unit by each surveillance unit capable of performing surveillance of the functional unit and on the basis of the knowledge of the different surveillance units of the avionic system, and on the other hand from diagnostics emitted or not emitted by the surveillance units capable of detecting a breakdown of the functional unit.

In effect, the emission or non-emission of a breakdown message by a surveillance unit following a breakdown of a functional unit depends directly on the mode of breakdown of the functional unit.

Thus the probability of occurrence of the breakdown message of a particular surveillance unit is directly related to the probability of the modes of failure of the components detected by that surveillance unit.

According to a particular embodiment of the invention, probabilities of occurrence representing the probability of occurrence of the mode of breakdown of a functional unit recorded by a surveillance unit are associated with the link between the acquired diagnostics and the modes of breakdown.

In addition, according to a particular mode of the invention, the likelihood criterion of the breakdown is additionally determined on the basis of the probability of occurrence of the mode of breakdown of a functional unit.

Step 230 is followed by step 240, which consists in selecting, as final diagnostic, that possible diagnostic among the possible diagnostics whose likelihood criterion is among the highest.

According to a particular mode, the selected diagnostic is that which maximizes the likelihood criterion.

Figure 3:
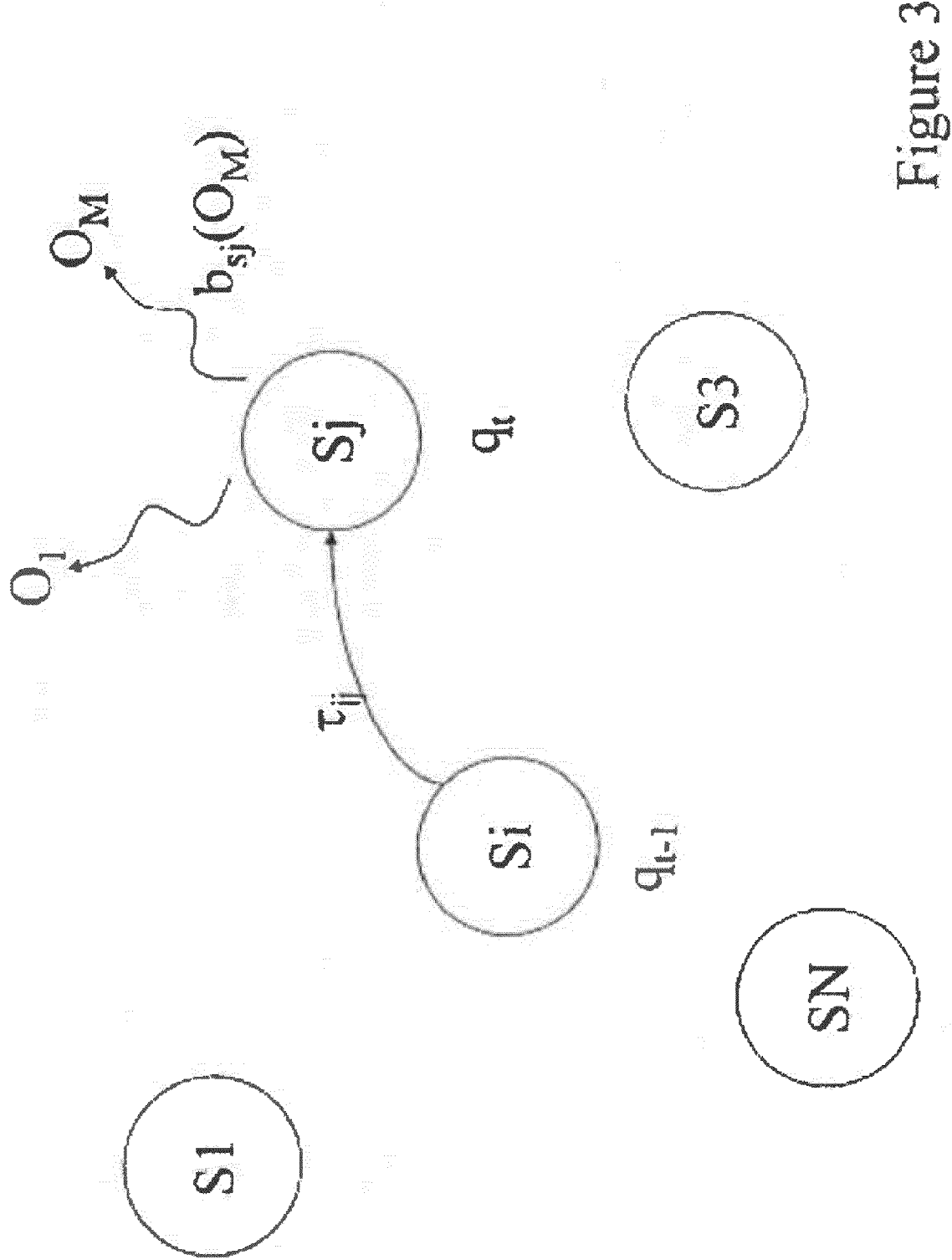
FIG. 3 illustrates a Markov model representing the states of the system.

FIG. 3 illustrates a Markov model that represents states of the system.

The set of individual states of a system is denoted by $S=\{S_1, \ldots, S_N\}$, and a sequence of states that are not directly observable is denoted by $Q=q_1, \ldots, q_T$. In addition, $q_t$ denotes the state at instant t, this state belonging to the set of individual states ($q_t \in S$).

A Markovian source can be represented by a set of transitions $\Gamma=\{\tau_1, \ldots, \tau_M\}$, where $\tau_{ij}$ is defined by the transition from a state $S_i$ to a state $S_j$.

The probability of the transition $\tau_{ij}$ is given by:

$$a(i,j)=p(q_{t-1}=s_i/q_t=s_j)$$

and we have $\Sigma_{J=1 \; to \; N} \, a(i,j)=1$, where i is between 1 and N.

A denotes the distribution of probabilities of the state transitions; thus $A=\{a_{ij}\}$.

In addition, $O=O_1, O_2, \ldots$, denotes a sequence of observations generated by a system.

To each state of the system there are attached different observations, each having a probability denoted as:

$$b_{si}(O_m)=p(O_m|S_i), \text{ where } m=1 \text{ to } M(S_i)$$

and we have $\Sigma_{m=1 \; to \; M} \, b_{si}(O_m)=1$, where i is between 1 and N.

In addition, B denotes the distribution of probabilities of the observations; thus $B=\{b_s\}$.

In addition, $\Pi$ denotes the initial state of the system.

The knowledge of N, M, $\Pi$ and $\lambda=(A, B)$ completely specifies the Markov model.

The theory of hidden Markov models makes it possible on the one hand to determine a sequence of states S according to an appropriate criterion on the basis of a sequence of observations O, and on the other hand to determine the model $\lambda$ in order to adjust it to maximize the probability $p(O|\lambda)$ of a breakdown of a functional unit when a sequence of observations is known.

It should be noted that, when a functional unit changes from the valid state to the breakdown state, the set of surveillance units that has detected this failure emits breakdown messages.

On the other hand, the surveillance units can provide only a list of functional units that have potentially changed state. Thus there is no access directly to the state of the set of functional units.

This set of functional units can then be treated as a hidden Markov model, in such a way that it is capable of locating the most probable diagnostic among the set of possible diagnostics explaining the set of breakdown messages received.

The method proposed to characterize the Markov model and to evaluate the likelihood of each possible diagnostic by means of data obtained from the topology of the maintenance system and from the error analysis, also known as FMEA/S ("Failure Mode and Effect Analysis/Summary" in English terminology), of each functional unit now is described according to an exemplary embodiment.

Thus a characterization of the architecture data now is described.

To achieve this, a set L of functional units is considered. Each functional unit is either in a valid state or in a breakdown state.

We then have $N=2^L$, such that the set L of functional units changes from one state to another upon the transition of a functional unit from the valid state to the breakdown state.

The probabilities of transitions of the states a are characterized by the reliability of each functional unit, denoted by $\lambda_{LRU}$.

Thus, for each transition (a(i,j)), we therefore have $a(i,j)=\lambda_{LRU}$ (that the functional unit changes from the valid state to the breakdown state)/$\Sigma \lambda LRU$.

Thus the emission or non-emission of a breakdown message by a surveillance unit during this transition depends on the mode of breakdown of the functional unit.

For example, a total loss of power supply or of the digital core of the functional unit is detected by the set of surveillance units observing this functional unit.

On the other hand, a failure of the component managing an output of the functional unit, especially an output of the ARINC 429 bus (not looped), is detected only by the surveillance unit connected to this bus.

Thus the probability of occurrence of the breakdown message of a particular surveillance unit is related to the probability of the modes of failure of the components detected by that surveillance unit.

In addition, SURV denotes the set of surveillance units observing a surveillance unit, this set being known by an inventory compiled during design of the architecture.

The observation of a functional unit by a surveillance unit is denoted by $OBS_{LRU}(BITE)$, the fact that the surveillance unit sends or does not send a breakdown message casting suspicion on the surveillance unit.

To achieve this, $OBS_{LRU}(BITE)$ will be equal to 1 ($OBS_{LRU}(BITE)=1$) when the surveillance unit sends a breakdown message casting suspicion on a functional unit. And $OBS_{LRU}(BITE)$ will be equal to 0 ($OBS_{LRU}(BITE)=0$) when the surveillance unit does not send a breakdown message.

In addition, $O_{LRU}$ denotes the set of available observations:

$$O_{LRU} = \{OBS_{LRU}(BITE)/BITE \in SURV\}$$

In addition, $b_{ij}(O_{LRU})$=(sum of probabilities of the modes of failure detected by all of the surveillance units such that $OBS_{LRU}(BITE)=1$)/$\lambda_{LRU}$.

In this way there is reconstructed a hidden Markov model, which will be used to determine the state of the set L of functional units that is the most probable according to the observations.

The determination of the observations now is described.

FM denotes the set of messages sent by the surveillance units to the central maintenance system.

These messages are local diagnostics worked up by the surveillance units.

These messages comprise a validity period as well as a set of unitary local diagnostics.

The validity period is composed of a date of appearance of a fault, also known as the detection date (T0) and a date of disappearance of the fault (T1).

In addition, each unitary local diagnostic is made up of a composition of functional units whose breakdown or breakdowns is or are responsible for the dysfunctions detected by the surveillance units.

This composition of functional units comprises a functional unit or several functional units linked by the logical operator ET.

Thus the set of messages FM sent by a surveillance unit i is denoted by:

FMi=(T0, T1, {unitary diagnostic})

Let us consider as a first hypothesis that the local diagnostics are true, or in other words that one of the unitary local diagnostics is true at every instant of the validity period of the message. Thus the functional unit or units suspected in this diagnostic are in breakdown.

Let us consider as a second hypothesis that, outside the validity period of the message, the central maintenance system considers that it does not have sufficient information to conclude that the logical condition that it contains is false.

In this case dating is not used at first in the algorithm of the central maintenance system. Similarly, the disappearance of a breakdown is not taken into account.

Let us consider as a third hypothesis that the local diagnostics are sent to the central maintenance system as soon as a symptom appears, in other words, a single event causes the message to be sent. According to this definition, the granularity of the event is defined as being the transition of a functional unit from the valid state to the breakdown state.

For example, if we consider the message:

FM1=(T0, T1, {LRUA or LRUB or (LRUC and LRUD)})

This message is sent following the breakdown of one and only one of the functional units A, B, C or D.

According to this hypothesis, some events are hidden. In fact, in the preceding example, if the message is due to the breakdown of functional unit C (respectively of functional unit D), the first breakdown of functional unit D (respectively of functional unit C) was not reported.

According to one embodiment of the invention, these messages are grouped into items known in English terminology as "leg items" (LI), which are packets in which messages whose local diagnostics cast suspicion on at least one and the same functional unit are organized in groups of two.

The set of functional units suspected in a group of messages forms the Markov subset L, on which it is sought to establish a diagnostic is conducted. The subsets L are disjunct by construction.

If we consider the following example, in which a first message FM1 comprises the functional entity A or the functional entity B (FM1=A or B), a second message FM2 comprises the functional entity B or the functional entity C (FM2=B or C), a third message FM3 comprises the functional entity C (FM3=C), and a fourth message FM4 comprises the functional entity D or the functional entity E (FM1=D or E).

A first group of messages comprises, for example, FM1, FM2 and FM3 (LI1=FM1, FM2, FM3), then the subset L1 comprises the functional entities A, B and C (L1={A, B, C}).

A second group of messages comprises, for example, FM4 (LI2=FM4), then the subset L2 comprises the functional entities D and E (L2={D, E}).

For each group of messages (LI), DLI denotes the set of diagnostics satisfying the set of local diagnostics of the messages of the group of messages, and DLIi denotes one of the diagnostics satisfying the set of local diagnostics of the messages of the group of messages.

By construction, a unique event is the cause of a message. Thus the groups of messages of unitary diagnostics are therefore determined by the set of combinations of unitary local diagnostics, in such a way that two of these unitary diagnostics, if they belong to the same message, cannot be associated with one another.

Thus, if we consider the following example, according to which a first message FM1 comprises the functional entity A ($FM_1=\{A\}$), a second message FM2 comprises the functional entity A or the functional entity B or the functional entity C ($FM_2=\{A, B, C\}$).

We then deduce therefrom that the set of diagnostics satisfying the set of local diagnostics of messages of the group of messages comprises the following diagnostics. The first diagnostic is a failure of the functional entity A, the second diagnostic is a failure of the functional entities A and B, and the third diagnostic is a failure of the functional entities A and C.

Thus DLI={A, A and B, A and C}

In addition, the diagnostic according to which the functional entities A and B and C are in failure is discarded.

In fact, in the absence of observations, the diagnostic that minimizes the number of events must be preferred.

It should be noted that, in certain cases, the same diagnostic may be constructed from several combinations of unitary local diagnostics. Nevertheless, it is necessary to retain the set of combinations. In fact, these different combinations correspond to a different ordered sequence of simple events.

Ev(DLIi) denotes the set of supposed events that have produced the diagnostic DLIi and that have or have not been detected by the surveillance units.

From this set, we can reconstruct the diagnostic $OBS_{LRU,t}(BITE)$ for each functional unit, and we can deduce the set of available observations:

$$O_{LRU,t} = \{OBS_{LRU,t}(BITE)/BITE \in SURV\}.$$

If we consider the following example, in which surveillance unit BITE1 performs surveillance of functional units A and B, surveillance unit BITE2 performs surveillance of functional units B and C, surveillance unit BITE3 performs surveillance of functional unit C, and surveillance unit BITE4 performs surveillance of functional unit B.

The following messages are emitted.

Surveillance unit BITE1 emits the message FM1 indicating the diagnostic according to which functional unit A or (exclusive OR) functional unit B is in failure (FM1=A or B).

Surveillance unit BITE2 emits the message FM2 indicating the diagnostic according to which functional unit B or (exclusive OR) functional unit C is in failure (FM2=B or C).

Surveillance unit BITE3 emits the message FM3 indicating the diagnostic according to which functional unit C is in failure (FM3=C).

Surveillance unit BITE4 does not emit any message.

From this we deduce the set of diagnostics satisfying the set of local diagnostics of the messages of the group of the following messages (DLI). A first possible diagnostic DLI1 indicates a failure of functional units A and B and C (DLI1=AandBandC), a second possible diagnostic DLI2 indicates a failure of functional units A and C (DLI2=AandC), a third possible diagnostic DLI3 indicates a failure of functional units B and C (DLI3=BandC), and a fourth possible diagnostic DLI4 indicates a failure of functional units B and C (DLI4=BandC).

Thus, with the diagnostic DLI1 corresponding to a failure of functional units A, B and C, there are associated the following observations:

$O_{LRU\,A}$={OBS(BITE1)=1}

$O_{LRU\,B}$={OBS(BITE1)=0; OBS(BITE2)=1; OBS(BITE4)=0}

$O_{LRU\,C}$={OBS(BITE2)=0; OBS(BITE3)=1}

In fact, during workup of this possible diagnostic DLI1, it is considered that the failure of functional unit A was recorded by surveillance entity BITE1, leading to the following observation:

$O_{LRU\,A}$={OBS(BITE1)=1}

Then it is considered that the failure of functional unit B was recorded by surveillance entity BITE2 and not by BITE1 or BITE4, leading to the following observation:

$O_{LRU\,B}$={OBS(BITE1)=0; OBS(BITE2)=1; OBS(BITE4)=0}

Finally, it is considered that the failure of functional unit C was recorded by surveillance entity BITE3 and not by BITE2, leading to the following observation:

$O_{LRU\,C}$={OBS(BITE2)=0; OBS(BITE3)=1}

Concerning diagnostic DLI2 corresponding to a failure of functional units A and C, there are associated the following observations:

$O_{LRU\,A}$={OBS(BITE1)=1}

$O_{LRU\,B}$={OBS(BITE1)=0; OBS(BITE2)=0; OBS(BITE4)=0}

$O_{LRU\,C}$={OBS(BITE2)=1; OBS(BITE3)=1}

In fact, during workup of this possible diagnostic DLI2, it is considered that the failure of functional unit A was recorded by surveillance entity BITE1, leading to the following observation:

$O_{LRU\,A}$={OBS(BITE1)=1}

And it is considered that the failure of functional unit C was detected by surveillance entity BITE2 and not by BITE3, leading to the following observation:

$O_{LRU\,C}$={OBS(BITE2)=1; OBS(BITE3)=1}

And no surveillance unit detected a failure of functional unit C, leading to the following observation:

$O_{LRU\,B}$={OBS(BITE1)=0; OBS(BITE2)=0; OBS(BITE4)=0}

Concerning the sets of diagnostics DLI3 and DLI4 corresponding to a failure of functional units B and C, two sequences of events are the following:

The set of events concerning the diagnostic DLI3, Ev(DLI3), is the following. The failure of functional unit B generated the messages FM1 and FM2, and the failure of functional unit C generated the message FM3.

The set of events concerning the diagnostic DLI4, Ev(DLI4), is the following. The failure of functional unit B generated the message FM1, and the failure of functional unit C generated the messages FM2 and FM3.

Thus the two sequences of events Ev(DLI3) and Ev(DLI4) generate different observations:

Concerning the diagnostic DLI3, $O_{LRU\,A}$={OBS(BITE1)=0}

$O_{LRU\,B}$={OBS(BITE1)=1; OBS(BITE2)=1; OBS(BITE4)=0}

$O_{LRU\,C}$={OBS(BITE2)=0; OBS(BITE3)=1}

Concerning the diagnostic DLI4, $O_{LRU\,A}$={OBS(BITE1)=0}

$O_{LRU\,B}$={OBS(BITE1)=1; OBS(BITE2)=0; OBS(BITE4)=0}

$O_{LRU\,C}$={OBS(BITE2)=1; OBS(BITE3)=1}

The calculation of the likelihood of the diagnostics now is illustrated.

To achieve this, let us consider a particular group of messages (LI).

For each set of diagnostics satisfying the set of local diagnostics of the messages of the group of messages (DKIi), the likelihood criterion $\Sigma$ is evaluated in the following manner $\Sigma(DLIi)=P(DLIi|FM)$ Thus the likelihood criterion corresponding to the probability of the set of local diagnostics DLIi, knowing the set of sent messages FM.

By using Bayes' theorem, we have:

$$\Sigma(DLI_i) = P(DLI_i \mid FM)$$
$$= P(DLI_i \text{ and } FM)/P(FM)$$

Since P(FM) is identical for the set of diagnostics, we can limit ourselves to comparing $\sigma(DLI_i)=P(DLI_i$ and FM).

On the other hand, since the breakdowns are independent, we have $\sigma(DLI_i)=\Pi_{LRU \in DLIi}$ P(LRU in breakdown and FM)

And according to the equivalences demonstrated in the observations, we have $$\sigma(DLI_i) = \Pi_{LRU \in DLIi} P(LRU \text{ in breakdown and } Ev(DLI_i))$$
$$= \Pi_{LRU \in DLIi} P(LRU \text{ in breakdown and } O_{LRU})$$

The diagnostic maximizing $\sigma(DLI_i)=\Pi_{LRU \in DLIi}$ P(LRU in breakdown and $O_{LRU}$) is that presented to the maintenance operator, since it is that which is the most probable, given the set of observations.

The calculation of the probability of the two events, P(LRU in breakdown and $O_{LRU}$), now is described.

According to a first embodiment, in which the Markov model is of first order, and according to the previously presented second hypothesis in which, outside the validity period of the message, the central maintenance system considers that it does not have sufficient information to conclude that the logical condition that it contains is false, it is considered that the Markov model does not depend on time. This is equivalent to not taking into account the hidden events, the disappearances of breakdowns and the phenomena of degradation with time.

The calculation of the diagnostic is therefore performed one time at the end of the flight of the airplane, by considering the set of available observations.

To calculate $P(LRU$ in breakdown and $O_{LRU})$, we shall consider the failure modes of the components of the functional unit LRU according to their observabilities by the different surveillance units.

Thus the failure rate $\lambda_{LRU}$ of each functional unit is subdivided in the following manner:

λcc: rate of failure modes of the functional unit detected by the owner's surveillance entity (BITE owner) and by the set of observers' surveillance entities (BITE observers), λint: rate of failure modes of the functional unit detected only by the owner's surveillance entity (BITE owner), λcext: rate of failure modes of the functional unit detected by the owner's surveillance entity (BITE owner) and by several (but not all) observers' surveillance entities (BITE observer (i)), λext(i): rate of failure modes of the functional unit detected by the owner's surveillance entity (BITE owner) and one and only one observer's surveillance entity (BITE observer (i)), λext: rate of failure modes of the functional unit detected by several observers' surveillance entities (BITE observer (i)), λext(i): rate of failure modes of the functional unit detected by one and only one observer's surveillance entity (BITE observer (i)), λnd: rate of failure modes of the functional unit that were not detected.

According to one embodiment in which the failure modes associated with the rate of failure modes of the functional unit that were not detected (λnd) have no functional effects, these failures do not lead to maintenance action and are therefore not considered.

We then introduce λlrud, which represents the rate of functional breakdowns of the functional unit.

Figure 4:
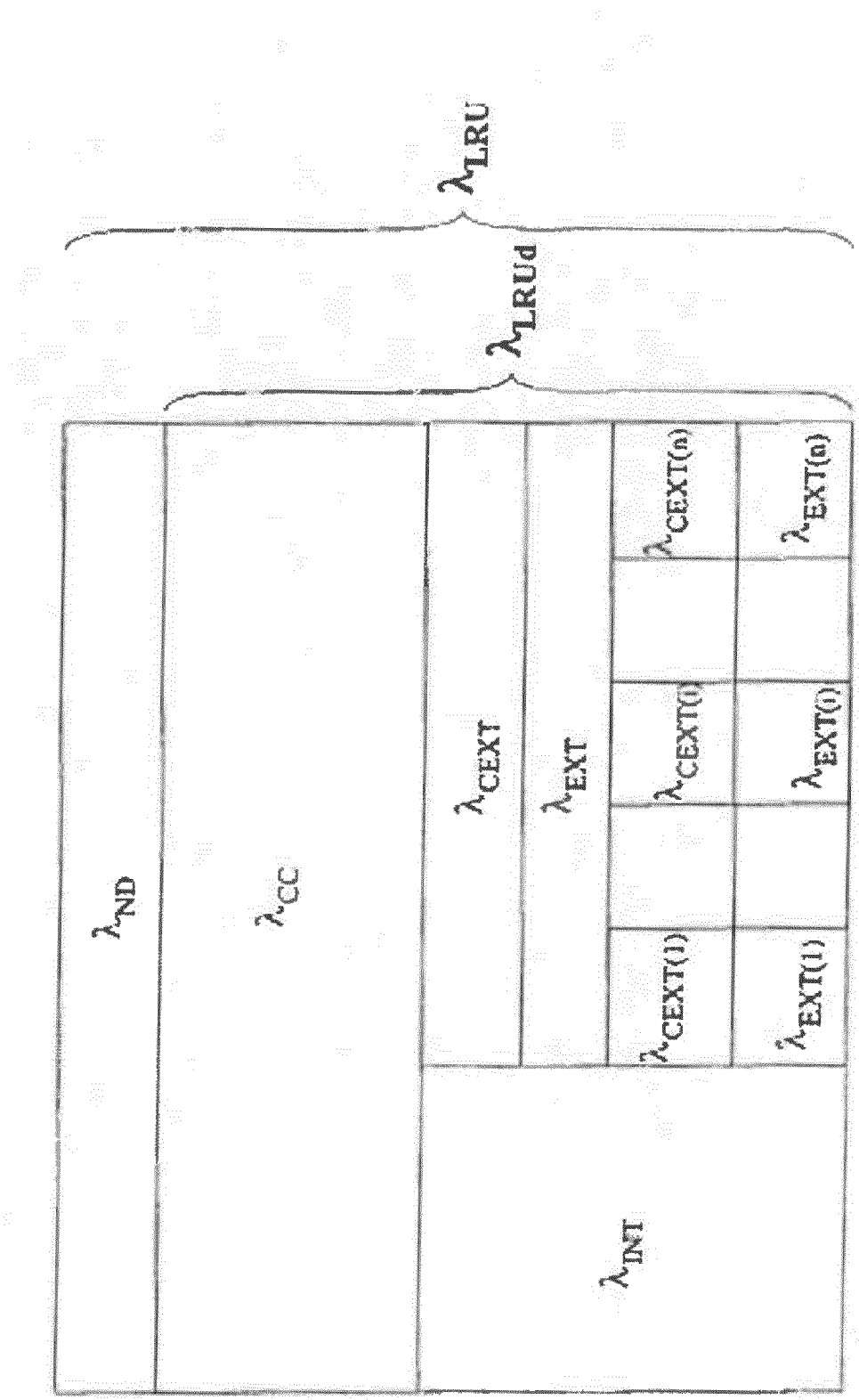
FIG. 4 illustrates the distribution of failure rates of each functional unit.

FIG. 4 illustrates the distribution of the failure rates of each functional unit.

Thus the probability of each observation is calculated by means of the following formulas:

if the owner's surveillance entity detected the breakdown, the failure mode of the functional unit lies within the rate (λcc+λint+λcext+Σλcext(i)), in addition:
    if none of the observers' surveillance entities detected the breakdown, the failure mode of the functional unit lies within the rate λint, then we have $P(LRU$ in breakdown and $O_{LRU})=\lambda int/\lambda Irud$ if all of the observers' surveillance entities detected the breakdown, the failure mode of the functional unit lies within the rate % cc, then we have $P(LRU$ in breakdown and $O_{LRU})=\lambda cc/\lambda Irud$ if one and only one of the observers' surveillance entities detected the breakdown, the failure mode of the functional unit lies within the rate % λcext(i), then we have $P(LRU$ in breakdown and $O_{LRU})=\lambda cext(i)/\lambda Irud$ if several but not all of the observers' surveillance entities detected the breakdown, then we have $P(LRU$ in breakdown and $O_{LRU})=\lambda ext/\lambda Irud$ if the owner's surveillance entity did not detect the breakdown, the failure mode of the functional unit lies within the rate (λext+Σλext(i)), in addition:
    if one and only one of the observers' surveillance entities detected the breakdown, then we have $P(LRU$ in breakdown and $O_{LRU})=\lambda cext(i)/\lambda Irud$ if several of the observers' surveillance entities detected the breakdown, then we have $P(LRU$ in breakdown and $O_{LRU})=\lambda ext/\lambda Irud$ According to a second embodiment, in which the Markov model is of nth order, it is considered that the surveillance entities always send a message following a failure of a functional unit. Nevertheless, this is not always the case. In fact, this model does not take into account the time, or in other words the hidden events, the disappearance of breakdowns or the partly erroneous messages, also known as "spurious" in English terminology.

According to this embodiment, the calculation of the diagnostic is carried out in the course of the flight of the airplane according to the observations, and it should be refined in the course of time.

An example of hidden events is given by way of illustration.

According to this example, functional unit A suffers a breakdown, but surveillance entity BITE1 sends the following message, indicating that functional unit A or functional unit B is in failure: FM1=A or B.

Functional unit B suffers a breakdown, then surveillance entity BITE1 does not modify its message and surveillance entity BITE2 sends the following message, indicating that functional unit B is in failure: FM2=B.

An analysis of these messages suggests that the preferred airplane diagnostic is "functional unit B in breakdown", whereas the correct diagnostic is "functional unit A in breakdown and functional unit B in breakdown".

A partly erroneous message is given by way of illustration.

According to this example, functional unit A suffers a breakdown, then surveillance entity BITE1 sends the following message, indicating that functional unit A is in failure: FM1=A, and surveillance entity BITE2 does not send a message.

Functional unit B suffers a breakdown, then surveillance entity BITE2 sends the following message, indicating that functional unit A or functional unit B is in failure: FM2=A or B.

Message FM2 is said to be erroneous because, if it were true, it should have been emitted as soon as the breakdown of functional unit A.

In fact, as a result of the first hypothesis, according to which the local diagnostics are true, the totally erroneous messages, meaning those emitted when none of the suspect functional units is in failure, are supposed to be filtered before this algorithm.

To take these two specific cases into account, there is introduced a weighting coefficient for the different surveillance units in order to give preference to certain events rather than others according to certain rules.

This coefficient may reflect a temporal concept.

Thus, according to a particular embodiment, the coefficient takes the value 1 if the message from the observer's surveillance unit is emitted after the owner's surveillance unit, and the coefficient takes the value 0 in the opposite case.

This coefficient may reflect an observability concept.

Thus, according to a particular embodiment, the coefficient takes the value 1 if the message from the observer's surveillance unit is never erroneous, and the coefficient takes the value 0 in the opposite case.

This coefficient may also reflect any other condition that influences the probability of a transition, such as, for example, taking into account the prognostic for favoring a transition when the prognostic indicates to us a fairly high probability that a functional unit is in failure.

Thus each surveillance unit is assigned a weighting coefficient $\tau_{BITEij}$ that weights the probability of the event. We can write:

$\tau_{BITEi \to j}$ = f(n preceding transitions, flight phase, . . . )

We can also introduce a coefficient $\alpha(t)$ reflecting the results of the prognostic function for increasing the probability of breakdown in the case of a wear phenomenon.

By taking into account the coefficients $\tau_{BITEij}$ and $\alpha(t)$, the probability of each observation becomes:
  if the owner's surveillance unit detected the breakdown:
    if none of the observers' surveillance units detected the breakdown, then we have $$P(LRU \text{ in breakdown and } O_{LRU,t}) =$$
$$(\lambda int + \lambda cc * \Pi_{OBS(BITE)=0}[(1-\tau_{BITE})] + \lambda cext * \Pi_{OBS(BITE)=0}[(1-\tau_{BITE})] +$$
$$\Sigma_{BITE}[\lambda cext(i) * (1-\tau_{BITE})]) * \tau_{BITE\,owner} * \alpha(t)/\lambda lrud$$

if one and only one of the observers' surveillance units detected the breakdown, then we have $$P(LRU \text{ in breakdown and } O_{LRU,t}) =$$
$$(\lambda cc * \tau_{BITE(i)} * \Pi_{OBS(BITE)=0}[(1-\tau_{BITE})] + \lambda cext * \tau_{BITE(i)} *$$
$$\Pi_{OBS(BITE)=0}[(1-\tau_{BITE})] + \lambda cext(i) * \tau_{BITE(i)} * \tau_{BITE\,owner} * \alpha(t)/\lambda lrud$$

if several (but not all) of the observers' surveillance units detected the breakdown, then we have $$P(LRU \text{ in breakdown and } O_{LRU,t}) =$$
$$((\lambda cc + \lambda cext) * \Pi_{OBS(BITE)=0}[(1-\tau_{BITE})] *$$
$$\Pi_{OBS(BITE)=1}[\tau_{BITE}] * \tau_{BITE\,owner} * \alpha(t)/\lambda lrud$$

if all of the observers' surveillance units detected the breakdown, then we have $$P(LRU \text{ in breakdown and } O_{LRU,t}) = \lambda cc * \Pi_{OBS(BITE)=1}[\tau_{BITE}] * \tau_{BITE\,owner} * \alpha(t)/\lambda lrud$$

if the owner's surveillance unit did not detect the breakdown:
    if one and only one of the observers' surveillance units detected the breakdown, then we have $$P(LRU \text{ in breakdown and } O_{LRU}) =$$
$$((\lambda cc + \lambda cext) * (1-\tau_{BITE\,owner}) * \Pi_{OBS(BITE)=0}[(1-\tau_{BITE})] * \tau_{BITE} +$$
$$c\lambda ext(i) * (1-\tau_{BITE\,owner}) + \lambda ext * \Pi_{OBS(BITE)=0}[(1-\tau_{BITE})] * \tau_{BITE} +$$
$$\lambda ext(i) * \tau_{BITE(i)}) * \alpha(t)/\lambda lrud$$

if several of the observers' surveillance units detected the breakdown, then we have $$P(LRU \text{ in breakdown and } O_{LRU}) =$$
$$((\lambda cc + \lambda cext) * (1-\tau_{BITE\,owner}) * \Pi_{OBS(BITE)=0}[(1-\tau_{BITE})] *$$
$$\Pi_{OBS(BITE)=1}[\tau_{BITE}] +$$
$$\lambda ext * \Pi_{OBS(BITE)=0}[(1-\tau_{BITE})] * \Pi_{OBS(BITE)=1}[\tau_{BITE}]) * \alpha(t)/\lambda lrud$$

if no surveillance unit detected the breakdown, we will assume P(LRU in breakdown and $O_{LRU}$)=0, since the product of the $(1-\tau_{BITE})$ terms is very close to 0.

A practical example in which two functional units A and B are considered now is illustrated.

A surveillance unit BITE1 is an owner's surveillance unit for functional unit A. In addition, this functional unit is observed by two observers' surveillance units, specifically BITE2 and BITE3.

A surveillance unit BITE2 is an owner's surveillance unit for functional unit B. In addition, this functional unit is observed by an observer's surveillance unit, specifically BITE3.

In our specific case, surveillance unit BITE1 emits a message FM1 in order to indicate failure of functional unit A.

Surveillance unit BITE2 emits a message FM2 in order to indicate failure of functional unit B or of functional unit A.

Surveillance unit BITE3 does not emit a message.

The two messages FM1 and FM2 are grouped into the same message group, whose diagnostic (DLI1) satisfying the set of diagnostics is the following: {A, A and B}.

From this we deduce the different breakdown probabilities described in Table 1.

TABLE 1

|  | LRU A | LRU B |
|---|---|---|
| $\lambda cc/\lambda lrud$ | 0.45 | 0.5 |
| $\lambda int/\lambda lrud$ | 0.35 | 0.475 |
| $\lambda cext/\lambda lrud$ | N/A | N/A |
| $\lambda cext(i)/\lambda lrud$ | 0.05 (i = 1 to 2) | N/A |
| $\lambda ext/\lambda lrud$ | 0.05 | N/A |
| $\lambda ext(i)/\lambda lrud$ | 0.025 (i = 1 to 2) | 0.025 |

Table 2 illustrates the evaluation of the diagnostics, considering that the set of surveillance units has a coverage coefficient $\tau_{BITE}$ equal to 1.

TABLE 2

| Diagnostic DLI | Observations | P(A\|O) | Observations | P(B\|O) | σ |
|---|---|---|---|---|---|
| A | OBS(BITE1) = 1<br>OBS(BITE2) = 1<br>OBS(BITE3) = 0 | 0.05 | OBS(BITE2) = 0<br>OBS(BITE3) = 0 | N/A | 0.05 |
| A and B | OBS(BITE1) = 1<br>OBS(BITE2) = 0<br>OBS(BITE3) = 0 | 0.35 | OBS(BITE2) = 1<br>OBS(BITE3) = 0 | 0.475 | 0.17 |

Thus the diagnostic {AandB} is the most probable, whereas the logic unit would have wanted diagnostic {A} to be preferred if the fact that surveillance unit BITE3 did not emit a message had not been taken into account.

The invention claimed is:

1. A process for determining a diagnostic for a breakdown of an avionic system that includes a plurality of functional units and a plurality of surveillance units, each performing surveillance of at least one functional unit, the process comprising:
   acquiring, in a centralized maintenance system, unitary diagnostics from the plurality of surveillance units of the avionic system, each of the plurality of surveillance units providing the unitary diagnostics corresponding to the plurality of functional units, wherein the plurality of surveillance units perform surveillance on the plurality of functional units,
   constructing, in the centralized maintenance system, a possible diagnostics relating to the plurality of functional units on the basis of the acquired unitary diagnostics from the plurality of surveillance units, each of the possible diagnostics identifying the breakdown of the at least one functional unit, each of the possible diagnostics having a subset of the plurality of functional units associated therewith,
   determining, in the centralized maintenance system, a likelihood criterion for each of the constructed possible diagnostics, the likelihood criterion for each of the constructed possible diagnostics being determined according to the subset of the plurality of functional units associated thereto,
   selecting, in the centralized maintenance system, one of the constructed possible diagnostics according to the likelihood criterion to identify the breakdown of the at least one functional unit of the subset of functional units associated with the one of the constructed possible diagnostic selected.

2. The process according to claim 1, further comprising:
   determining a likelihood criterion for one of the constructed possible diagnostics from information of each functional unit associated with the one of the constructed possible diagnostics.

3. The process according to claim 2, wherein the information of a functional unit comprises:
   a detectability of a mode of breakdown of the functional unit by at least one surveillance unit that performs surveillance on the functional unit, and knowledge of all surveillance units of the avionic system, and
   unitary diagnostics emitted or not emitted by the at least one surveillance unit detecting the breakdown of the functional unit.

4. The process according to claim 3, wherein the information of each functional unit comprises:
   a detectability of each mode of breakdown of the functional unit by each surveillance unit that performs surveillance on the functional unit, and knowledge of all surveillance units of the avionic system, and
   unitary diagnostics emitted or not emitted by the at least one surveillance unit detecting the breakdown of the functional unit.

5. The process according to any one of claims 2 to 4, wherein said information of each functional unit is determined according to a weighting coefficient of each surveillance unit that performs surveillance of the functional unit.

6. The process according to claim 1, wherein construction of possible diagnostics comprises organizing the unitary diagnostics identifying the breakdown of at least one functional unit into groups of two.

7. The process according to claim 6, wherein, when the set of possible diagnostics is determined by combinations of unitary diagnostics, the process further includes determining, on the basis of the set of possible diagnostics, from at least one observation by the at least one surveillance unit for each functional unit, an observation corresponding to the detection of the breakdown of a functional unit by a surveillance unit.

8. The process according to claim 7, wherein the said at least one observation represents the diagnostics emitted or not emitted by the said at least one surveillance unit detecting the breakdown of the functional unit.

9. A device for determining a diagnostic for a breakdown of an avionic system that includes a plurality of functional units and a plurality of surveillance units, each capable of performing surveillance of at least one functional unit, the device comprising:
   means for acquiring unitary diagnostics from the plurality of surveillance units of the avionic system, each of the plurality of surveillance units providing the unitary diagnostics relating to the plurality of functional units, wherein the plurality of surveillance units perform surveillance on the plurality of functional units,
   means for constructing possible diagnostics relating to the plurality of functional units on the basis of the acquired unitary diagnostics, each of the possible diagnostics being associated with a subset of the plurality of functional units,
   means for determining a likelihood criterion for each of the constructed possible diagnostics, the likelihood criterion for each of the constructed possible diagnostics being determined according to the subset of the plurality functional units associated with each of the constructed possible diagnostics,
   means for selecting one of the constructed possible diagnostics according to the likelihood criterion to identify the breakdown of at least one functional unit of the subset of the plurality of functional units associated therewith.

10. The device according to claim 9, wherein the likelihood criterion for a constructed possible diagnostic is determined on the basis of information of each functional unit associated with the constructed possible diagnostic, said information of a functional unit comprising:
   detectability of a mode of breakdown of the functional unit by at least one surveillance unit performing surveillance of the functional unit, and knowledge of all surveillance units of the avionic system, and
   unitary diagnostics emitted or not emitted by the at least one surveillance unit detecting the breakdown of the functional unit.

11. The device according to claim 10, wherein said information of a functional unit comprises:
   detectability of each mode of breakdown of the functional unit by each surveillance unit performing surveillance of the functional unit, and knowledge of all surveillance units of the avionic system, and
   unitary diagnostics emitted or not emitted by the said at least one surveillance unit detecting the breakdown of the functional unit.

* * * * *